Aug. 23, 1960     J. M. EVANS ET AL     2,950,401
ELECTRICAL MOTORS
Filed Sept. 9, 1957
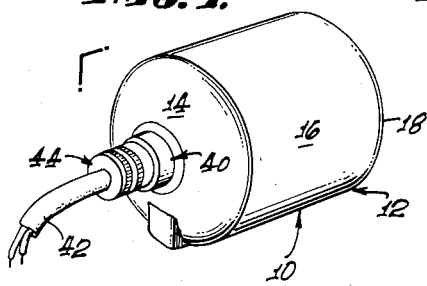
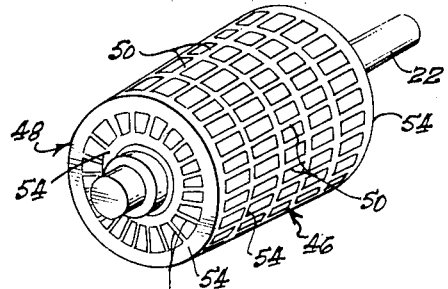
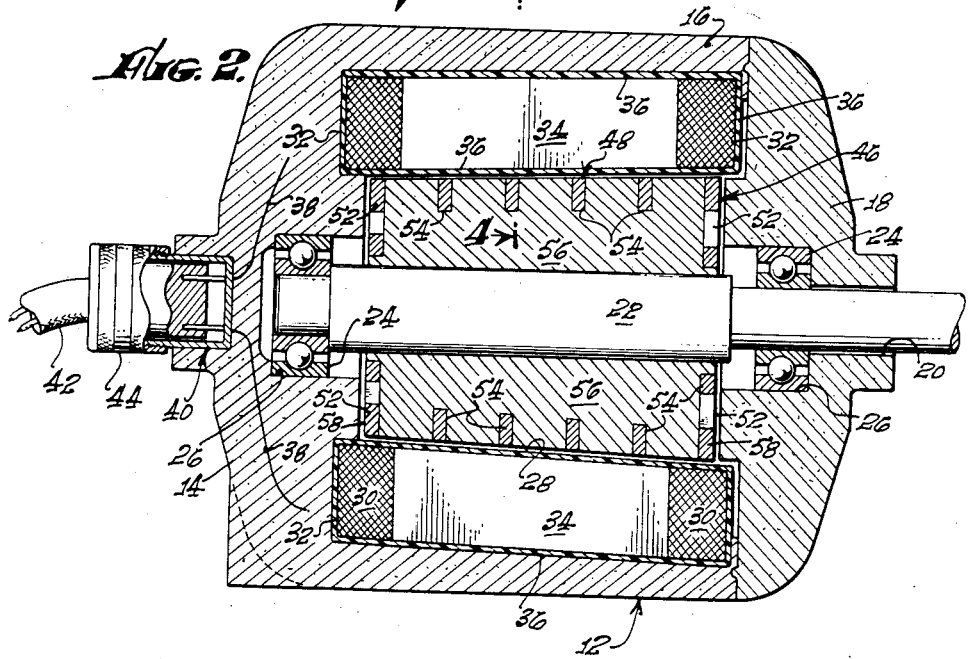
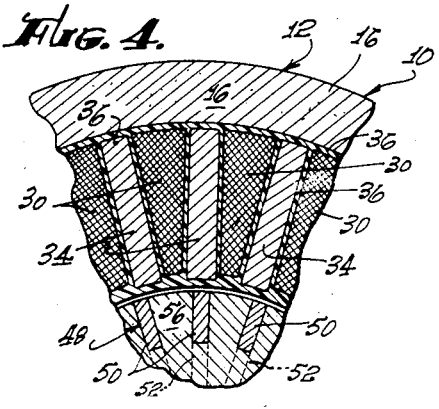
JOHN M. EVANS,
JIMMIE W. LUTTRELL,
INVENTORS.
BY *[signature]*
ATTORNEY.

United States Patent Office 2,950,401
Patented Aug. 23, 1960

2,950,401

ELECTRICAL MOTORS

John M. Evans and Jimmie W. Luttrell, Anaheim, Calif., assignors to Magna Power Motors, Inc., Fullerton, Calif., a corporation of California Filed Sept. 9, 1957, Ser. No. 682,703

8 Claims. (Cl. 310—44)

This invention relates to new and improved electrical motors. More specifically it relates to new and improved electrical motors of the induction type.

At the present time electrical motors of various types are employed for seemingly infinite variety of different tasks. In all of these applications electrical motors are employed so as to convert electrical energy into mechanical energy or power. Frequently electrical motors must be operated in various locations where they are subjected to extremely elevated temperatures, or where they are subjected to water, or even where they are operated in the presence of various explosive materials or the like. At the present time differently constructed electrical motors are employed for various specialized applications of the types indicated.

Such specialized motors have to be especially designed and manufactured. Frequently their cost is comparatively high and frequently their performance characteristics are comparatively unsatisfactory. Also, in many occasions such specialized motors are comparatively heavy or bulky. All of these factors tend to point out a very definite need for new and improved electrical motors which are capable of being used in virtually any location and which, in spite of their utilitarian or versatile nature, are comparatively inexpensive, and which have good electrical performance characteristics.

A broad object of the present invention is to provide new and improved electrical motors. More specifically an object of the present invention is to provide new and improved electrical motors which are waterproof, explosion-proof, and which are capable of being operated in elevated temperatures for an extended period without damage. Another related object of the present invention is to provide electrical motors which have the properties indicated in the preceding, and which also possess extremely advantageous electrical performance characteristics. A related object of the present invention is to provide new and improved induction motors in which the magnetic flux generated within these motors is efficiently utilized.

Because of the nature of this invention it is not considered necessary or expedient to set forth a further long list of various objects and advantages of the invention itself. Such other objects and advantages of the invention will be fully apparent to those skilled in the art to which this invention pertains from a detailed consideration of the remainder of this description including the appended claims and the accompanying drawing in which:

Fig. 1 is a perspective view of an induction motor of this invention;

Fig. 2 is a cross-sectional view taken at line 2—2 of Fig. 1;

Fig. 3 is a perspective view of the rotor employed in the motor shown in the preceding figures; and Fig. 4 is a partial cross-sectional view taken at line 4—4 of Fig. 2.

In all figures of the drawing, like numerals are used to designate like parts. Those skilled in the art to which this invention pertains will realize that a presently preferred embodiment of this invention is shown in the drawing. They will further realize that a wide variety of differently appearing electrical motors may be constructed so as to utilize certain of the invention features set forth in this specification.

As an aid to the understanding of this invention, it may be stated in essentially summary form that it concerns electrical motors, each of which includes a closed housing and a rotor rotatably mounted within this housing, this rotor being attached to a shaft which projects from the housing itself. With the invention the housing used is shaped so as to include an internal cavity having ends, and this housing is formed of a ferromagnetic material of a type as hereinafter indicated, this ferromagnetic material completely encasing various magnetic coils and located around the internal cavity within the housing.

Because of the nature of this invention, it is considered that it is best more fully explained by referring directly to the accompanying drawing. Here there is shown an induction motor 10 of the present invention which is formed so as to include a housing 12. It is noted that this housing 12 is formed with a bottom end 14, a cylindrical wall 16 and an end 18. In essence the end 18 is a cap which is preferably bonded to the wall 16 by a temperature resistant adhesive or the like. This end 18 is provided with a centrally located aperture 20 through which there projects a shaft 22. This shaft is rotatably carried on ball bearings 24 mounted within bearing cavities 26 formed in the ends 14 and 18. The shaft 22 projects completely through the center of a generally cylindrical cavity 28 formed within the housing 12 so as to be defined by the ends 14 and 18 and the wall 16.

In accordance with this invention, the material from which the housing 12 is constructed is important in obtaining a satisfactory motor. Preferably, this housing 12, that is, the ends 14 and 18 and the walls 16, are all composed of at least 95% by weight of discrete ferromagnetic particles bonded together. With the preferred motor 10 illustrated this housing 12 is formed of from about 95% to about 98% by weight of finely divided or discrete iron particles, each of this is coated with a thin oxide insulating layer and with from about 2% to about 5% by weight of a known epoxy heat resistant resin serving to bond the individual particles to one another.

With this type of construction the thin oxide layer surrounding each of the iron particles serves to partially insulate the individual particles employed from one another so as to cut down eddy current losses within the complete housing 12. The epoxy resin employed also serves the same purpose, and also serves to hold or bond the individual iron particles together. Obviously equivalent binders may be substituted for the epoxy resin specified. For the most advantageous magnetic properties to be achieved within the motor 10, this housing 12 is, as shown, substantially void-free, and the individual ferromagnetic particles employed within the housing are closely packed together.

Magnetic flux is created within the housing 12 by means of a series of overlapping coils 30, each of which has essentially square ends 32. As can be seen from the examination of Figs. 2 and 4 of the drawing, these coils 30 are arranged within the housing 12 around the inside of the cavity 28 within the wall 16, and are firmly imbedded within the housing 12 as shown so that between the overlapping coils 30 pole pieces 34 extend to the interior of the cavity 28 substantially as shown. These pole pieces 34 may be formed out of iron or other equivalent materials. However, it is preferred with the present invention to form the pole pieces 34 out of the same composition used for the housing 12, this composition being treated so that these pole pieces have a comparatively high magnetic flux density. With a ferromagnetic composition of the type indicated, such a high flux density may be achieved by pressing the pole pieces under extreme pressure until these pole pieces are extremely dense.

It is normally preferred with the present invention to coat the coils 30, the pole pieces 34 with a thin layer of an appropriate insulating material 36 capable of withstanding the conditions used in manufacturing the motor 10. This insulating material 36 may conveniently be a known epoxy resin or the equivalent, and it serves to prevent any possibility of short circuiting from the coils 30. These coils 30 are connected by means of wires 38 imbedded within the housing 12 to a conventional "cannon" type of plug 40 bonded to the end 14 of the housing 12 so as to extend therefrom. This plug 40 may be connected to a terminal wire 42 by means of a connecting member 44 of conventional construction so that the entire motor 10 may be electrically connected to a power source by a waterproof connection.

Within the cavity 28 the shaft 22 carries a rotor 46 of the type shown in Fig. 3 of the drawing. This rotor 46 includes a unitary cage type of conductor construction 48 having a set of rotor bars 50 extending parallel to the axis of the shaft 22 and having other sets of end rotor bars 52 extending toward the shaft 22. The bars 50 and 52 are converted at their ends to rings 54 which are spaced from and insulated from the shaft 22. In essence the rotor bars 50 and 52 may be termed or considered two sets of rotor bars going in opposite directions or at right angles to one another. The entire cage 48 consisting of the rotor bars 50 and 52, the rings 54 is held with respect to the shaft 22 by means of a ferromagnetic composition 56 of the type used for forming the housing 12. This composition is bonded to the shaft and forms a part of the rotor 46.

The precise construction of the rotor 46 illustrated is considered to be advantageous inasmuch as the conventional motor will not utilize the end flux generated by the coils. With the construction of the motor 10 as shown, the entire housing 12 operates, in effect, as a stator magnet, and serves to convey magnetic flux to the various parts of the cavity 28. This flux is conveyed in such a manner that both of the sets of bars 50 and 52 serve to aid in causing rotation of the shaft 22. Thus, virtually the entire cage 48 employed in the rotor 46 is employed to cut magnetic lines of flux. This type of construction differs from conventional rotor construction where a part of the cage within the rotor merely serves to short circuit bars which cut magnetic flux. An important feature of the present invention lies in the fact that the housing 12 serves to convey flux from the coils 30 so that the flux from both ends or sides of these coils are utilized efficiently with the rotor 46. Thus, with the housing 12 the ends 14 and 18 serve to complete a flux path from the back or outer sides of the coils 30 to the rotor 46.

In order to achieve effective flux utilization, it is preferred that the ends of the rotor 46 extend, as shown, approximately one-half of the distance between the ends of the pole pieces 34 and the ends of the coils 30, or to approximately the midpoints of the ends of the coils 30. Thus, the ends 58 of the rotor 46 are located essentially at points in the flux paths between the sides of the coils 30 so as to aid in the most efficient flux utilization. This flux utilization within the motor 10 is quite important.

Because of the fact that flux from both sides of the coils 30 is effectively utilized, motors constructed as herein indicated have a relatively high efficiency. Also, these motors have low losses, and relatively high power factors when compared with standard motors. In addition, however, motors such as the motor 10 are advantageous for other reasons. When an electric motor is constructed as herein indicated, this motor is both water- and explosion-proof. Further, it is capable of being operated at a relatively high temperature. The entire housing with a motor such as the motor 10 is of such a nature as to effectively convey heat from the interior of this motor to the outside of it where such heat may be dissipated by radiation, convection or conduction.

Those skilled in the art to which this invention pertains will realize that a wide variety of differently appearing electrical motors may be manufactured utilizing the essential features or principles of this invention. While the cavity 28 and the exterior of the rotor 46 have been described herein as being of a substantially cylindrical shape, it will be apparent from an examination of the drawing of this case, that walls on both the cavity 28 and the rotor 46 are tapered slightly, primarily because of problems in the manufacturing of the motor 10. Preferably, of course, the outside of the rotor 46 is spaced slightly from the interior of the cavity 28, and is located so as to rotate as close to the pole pieces 34 as conveniently possible. The appearance of the motor 10 is obviously capable of being changed in a wide variety of different manners. Also, various details with respect to the invention, the number of coils used, the arrangement and spacing of the bars 50 and 52 in the cage 48 and the like may be varied without departing from the essential or principal features of the present invention. It is important to note that motors constructed as herein described need not employ conventional coil shapes. Thus the motor herein shown and described is believed to open the door to the use of various new styles of windings permitting the construction of better and more versatile motors. Because of the fact that this invention is susceptible to a wide variety of modifications of this type, it is considered as being limited only by the appended claims forming a part of this disclosure.

This application is a continuation in part of the copending application Serial No. 597,767, filed July 13, 1956, entitled Magnetic Structure, now abandoned.

We claim:

1. An electrical motor which includes: an enclosed housing formed of discrete ferromagnetic particles bonded together, said housing being formed so as to include an internal, generally cylindrical shaped cavity formed therein, said cavity having ends, said housing serving as a stator magnet; coil means embedded within and bonded to said housing around the outside of said cavity so as to extend between said ends; means defining an opening leading from the center of one end of said cavity to the outside of said housing; shaft means rotatably supported within said housing so as to extend through said cavity and out through said opening; and rotor means attached to said shaft means within said cavity.

2. An electrical motor as defined in claim 1 wherein said ferromagnetic particles in said housing are insulated from one another.

3. An electrical motor as defined in claim 1 wherein said ferromagnetic particles are bonded together with a non-conductive resin, said resin serving to partially insulate said particles from one another so as to control eddy currents within said housing.

4. An electrical motor as defined in claim 1 wherein said ferromagnetic particles are finely divided iron particles, and wherein said finely divided iron particles are coated with a thin oxide coating serving to partially insulate said particles from one another, and wherein said particles are bonded together with a non-conductive resin, said resin serving to partially insulate said particles from one another.

5. An electrical motor as defined in claim 1 wherein said housing is composed of from 95% to 98% by weight of finely divided iron particles, said iron particles being partially coated with a non-conductive oxide layer, and wherein said particles are bonded together with an epoxy resin, said epoxy resin being present in the amount of from about 2% to about 5% by weight of total weight of said housing, and wherein said housing is substantially void free.

6. An electrical motor as defined in claim 1 wherein said rotor means extend between the ends of said cavity to approximately the midpoints of the ends of said coil means.

7. An electrical motor as defined in claim 1 wherein said coil means include ferromagnetic pole pieces, said pole pieces being located so as to extend from the outside of said cavity through said coil means.

8. An electrical motor as defined in claim 1 wherein said rotor means includes a conductive metal cage, said cage including bars extending at right angles to one another.

References Cited in the file of this patent

UNITED STATES PATENTS

| | | |
|---|---|---|
| 1,555,094 | Adams | Sept. 29, 1925 |
| 2,047,831 | Lund | July 14, 1936 |
| 2,174,652 | Casner | Oct. 3, 1939 |
| 2,387,073 | Horlacher | Oct. 16, 1945 |
| 2,548,133 | Treat | Apr. 10, 1951 |
| 2,761,985 | Schaefer | Sept. 4, 1956 |

FOREIGN PATENTS

| | | |
|---|---|---|
| 158,013 | Great Britain | Feb. 3, 1921 |